United States Patent [19]

Ilardo et al.

[11] Patent Number: 4,504,611
[45] Date of Patent: Mar. 12, 1985

[54] FLAME RETARDANT POLYAMIDE COMPOSITIONS

[75] Inventors: Charles S. Ilardo, Tonawanda; James J. Duffy, Buffalo, both of N.Y.

[73] Assignee: Occidental Chemical Corporation, Niagara Falls, N.Y.

[21] Appl. No.: 519,277

[22] Filed: Aug. 1, 1983

[51] Int. Cl.³ .................................................. C08K 5/34
[52] U.S. Cl. .................................. 524/101; 524/467; 524/405; 524/411
[58] Field of Search .............................. 524/101, 467

[56] References Cited

U.S. PATENT DOCUMENTS

| | | | |
|---|---|---|---|
| 3,630,988 | 12/1971 | Deyrup | 524/467 |
| 4,105,621 | 8/1978 | Maslen et al. | 524/606 |
| 4,360,616 | 11/1982 | Pagilagan | 524/100 |
| 4,363,890 | 12/1982 | Ohshita et al. | 524/101 |

FOREIGN PATENT DOCUMENTS

| | | | |
|---|---|---|---|
| 2322173 | 3/1977 | France | 524/467 |
| 52-60844 | 5/1977 | Japan | 524/467 |

Primary Examiner—Lewis T. Jacobs
Attorney, Agent, or Firm—J. F. Tao; A. S. Cookfair

[57] ABSTRACT

Polyamide compositions having improved flame retardant properties and arc tracking resistance comprises, in percent by weight, about 35 to about 76 percent polyamide; about 6 to about 10 percent zinc borate; about 10 to about 15 percent melamine cyanurate; 0 to about 35 percent glass fiber; about 0 to about 3 percent antimony trioxide; and about 8 to about 15 percent of a chlorinated compound of the formula:

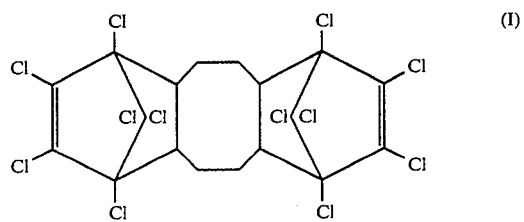

(I)

7 Claims, No Drawings

FLAME RETARDANT POLYAMIDE COMPOSITIONS

BACKGROUND OF THE INVENTION

This invention relates to flame retardant polyamide compositions having improved arc tracking resistance.

Flame retardant polyamide molding compositions are used extensively for the manufacture of articles and parts for electrical applications. For such purposes it is often required that the polyamide composition exhibit a high arc tracking resistance as well as flame retardant properties.

U.S. Pat. No. 4,247,450 discloses polyamide compositions having both fire resistance and arcing resistance, comprising a polyamide, 5 to 25 percent of a flame-proofing agent, 0.2 to 20 percent cadmium oxide and, optionally, an additional inorganic compound such as zinc borate. The flame proofing agent may be a reaction product of two moles of hexachlorocylopentadiene and one mole of cyclooctadiene.

U.S. Pat. No. 4,105,621 to Maslen et al discloses flame retardant polyamide compositions having arc tracking resistance comprising 30–74.95 percent polyamide, 15–55 percent glass fiber, 5–30 percent of a halogenated flame retardant, 5–30 percent zinc borate, 0.05 to 15 percent of an oxide such as antimony oxide or zinc oxide. The preferred halogenated fire retardants are compounds described in British Patent Specification No. 1,090,598, especially the compound of the formula $C_{18}H_{12}Cl_{12}$ (corresponding to structural formula (I), below).

U.S. Pat. No. 4,360,616 to Pagiligan discloses flame retardant polyamide compositions having arc tracking resistance, comprising (a) 40–65 weight percent polyamide, (b) 16–35 weight percent melamine, melam, melamine cyanurate, or a melamine derivative, (c) 1–7 weight percent of a chlorinated compound prepared from condensation of two moles of perchlorocyclopentadiene and one mole of 1,5-cyclooctadiene, (d) 1–4.9 weight percent of zinc borate or zinc oxide (e) 5–30 weight percent glass fibers.

SUMMARY OF THE INVENTION

In accordance with this invention there is provided polyamide compositions having improved flame retardant properties and arc tracking resistance, comprising in percent by weight; (a) about 35 to about 76 percent polyamide; (b) about 6 to about 10 percent zinc borate; (c) about 10 to about 15 percent melamine cyanurate; (d) about 0 to about 35 percent glass fiber; (e) about 0 to about 3 percent antimony trioxide; and (f) about 8 to about 15 percent of a chlorinated compound of the formula

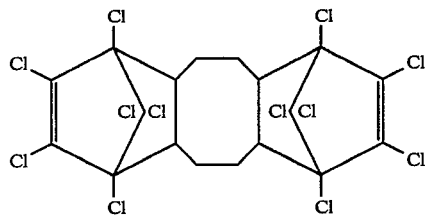

The chlorinated compound of formula (I) may be prepared by condensing two moles of hexachlorocyclopentadiene with one mole of 1,5-cyclooctadiene in xylene at a temperature below 200 degrees centigrade. The compound melts with decomposition at about 350 degrees Celsius and has a vapor pressure of 0.006 millimeter of mercury at 197 degrees Celsius. For convenience, this compound will be referred to herein as bis(hexachlorocyclopentadieno)cyclooctane.

The preferred compositions of this invention are fiber-reinforced polyamide compositions, comprising, in percent by weight: (a) 35 to 55 percent polyamide; (b) 6 to 10 percent zinc borate; (c) 10 to 15 percent melamine cyanurate; (d) 15 to 35 percent glass fiber; (e) 0 to 3 percent antimony trioxide; and (f) 8 to 15 percent of bis-(hexachlorocyclopentadieno)cyclooctane, based on a total of 100 percent for components (a) through (f).

DETAILED DESCRIPTION OF THE INVENTION

The polyamides suitable for use in the compositions of this invention are those polymers commonly known by the generic term, nylon, characterized by the presence of recurring amide groups as an integral part of the polymer chain. Included are the various nylon homopolymers, copolymers, and the like as well as blends thereof. Typical of the nylon compositions are polycaprolactam (nylon 6); the polyamides derived by condensation of dicarboxylic acid with a diamine, such as polyhexamethylene adipamide (nylon 66), polyhexamethylene sebacamide (nylon 610), and polyhexamethylene dodecanediamide (nylon 612), as well as copolymers and blends and the like such as nylon 66/6; nylon 66/610; nylon 66/612; nylon 66/610/6; nylon 66/612/6 and the like.

The zinc borate employed should be in a form that is stable under processing conditions. That is, with minimum evolution of volatile material at molding temperatures. The preferred form of zinc borate is the hydrate represented by the formula $2ZnO.3B_3O_3.xH_2O$ here x is between 3.3 and 3.7. This material is substantially stable at temperatures below about 300° Celsius. The higher hydrates such as $2ZnO.3B_2O_3.7H_2O$ and $2ZnO.3B_2O_3.9H_2$ lose water below the processing temperature of most polyamides and are recommended for use primarily with the low melting polyamides. Anhydrous zinc borate may be employed but is not generally preferred. In the molding compositions of this invention, the zinc borate is present in an amount of about 6 to 10 percent by weight, based on the total composition.

Melamine cyanurate is characterized by the empirical formula $C_6H_9N_9O_3$ and a melting or decomposition point about 350° Celsius. It is prepared by the reaction of melamine with cyanuric acid. Melamine cyanurate is employed in the molding compositions of this invention in amounts of about 10 to 15 percent by weight based on the total composition.

In the preparation of fiber-reinforced polyamide molding compositions of the invention, there may be employed the glass fibers commercially available for polymer molding resin reinforcement. The glass fibers are preferably employed in an amount of about 15 to 35, and most preferably 20 to 30 percent by weight.

Antimony trioxide may be employed in amounts of up to about 3 percent. For molding compositions utilizing nylon 6 or a blend containing nylon 6, it is preferred to incorporate about 1 to about 3 percent antimony trioxide to provide greater flame retardancy. For compositions utilizing other nylons, such as nylon 66, the inclusion of antimony trioxide is not preferred.

The nylon and flame retardant components can be compounded to form an intimate mixture, suitable for molding, by various known methods. The components may be ground or pulverized and the powders mixed in a conventional fashion to form a blend suitable for molding techniques. Alternatively, the fire retardant components may be added and mixed with the molten polymer blend. The blend may then be molded, extruded, or otherwise formed into useful articles or shapes, and is particularly adaptable for injection molding techniques. Furthermore, various other additives may be incorporated into the blend such as plasticizers, lubricants, fillers, dyes, pigments, mold release agents, anti-static agents, and the like.

The following specific examples are provided to further illustrate this invention and the manner in which it may be carried out. It will be understood, however, that the specific details given in the examples have been chosen for purpose of illustration and are not to be construed as a limitation on the invention. In the examples, unless otherwise indicated, all parts and percentages are by weight and all temperatures are in degrees Celcius.

EXAMPLES 1–7

A series of flame retardant nylon molding compositions were prepared and injection molded in the form of $\frac{1}{8} \times \frac{1}{2} \times 5''$ bars. The injection molded bars were tested to determine various physical properties.

The nylon molding compositions were prepared as follows: the nylon component was ground to pass a 1 mm sieve. The powdered flame retardant additives and glass fibers were blended with the nylon particles following the initial grinding. The mixtures were dried overnight at 70°–105° C.; and extruded at 260°–270° C. into a ribbon form. The extrudates were pelletized and redried before injection molding at 270°–290° C. The injection molded bars were tested to determine flame retardance and various physical properties, with the results set forth in Table I.

In the table, Example 1, 2, 5, 6 and 8 are provided for comparative purposes. Example 1 typifies a prior art, glass-reinforced, flame retarded polyamide molding composition employed in the electronics industry. For electronic applications it is desirable to improve arc tracking resistance, preferably to at least about 340 and most preferably 400 volts. Example 2 demonstrates that some improvement in arc tracking (i.e., comparative tracking index or CTI) that can be achieved by replacing antimony oxide with zinc borate in compositions containing nylon 66. Examples 5 and 6 illustrate compositions using melamine cyanurate in accordance with the teachings of the prior art. U.S. Pat. No. 4,360,616 teaches that the presence of melamine or its derivatives in compositions of the type shown, aids in improving arc tracking resistance while aiding in maintaining good flame retardancy, and permits less zinc borate or oxide and less halogenated flame retardant to be present. However, in the compositions of Examples 5 and 6, although melamine cyanurate was employed at high levels and the zinc borate or oxide and halogenated flame retardant was employed at lower levels, the molded composition failed to pass the Underwriters Laboratories Test Standard No. 94.

TABLE I

| Composition | Units | C 1 | C 2 | 3 | 4 | C 5 | C 6 | 7 | C 8 | 9 | 10 | 11 | 12 |
|---|---|---|---|---|---|---|---|---|---|---|---|---|---|
| Nylon 66 | % | 50 | 55 | 37.5 | 45 | 47 | 45 | 42.5 | — | — | — | — | — |
| Nylon 6 | % | — | — | — | — | — | — | — | 42.5 | 41 | 41 | 43 | 38 |
| Fiberglass | % | 30 | 25 | 27.5 | 27.5 | 25 | 25 | 27.5 | 27.5 | 25 | 25 | 25 | 25 |
| Melamine Cyanurate | % | — | — | 15 | 12.5 | 25 | 25 | 10 | — | 12.5 | 12.5 | 10 | 15 |
| Dechlorane Plus | % | 16 | 16 | 12 | 9 | 3 | 4 | 12 | 24 | 12.5 | 12.5 | 10 | 10 |
| Zinc Borate | % | — | 4 | 8 | 6 | — | 1 | 8 | — | 7 | 7 | 10 | 10 |
| Zinc Oxide | % | — | — | — | — | 2 | — | — | — | — | — | — | — |
| $Sb_2O_3$ | % | 4 | — | — | — | — | — | — | 6 | 2 | 2 | 2 | 2 |
| CTI | Volts | 230 | 380 | 430 | 430 | 470 | 490 | 430 | 230 | 320 | 325 | 250 | 350 |
| UL-94 $\frac{1}{8}''$ | Class | V-0 | V-0 | V-0 | V-1 | Fail* | Fail | V-1 | V-0 | V-0 | V-1 | V-0 | V-0 |
| Tensile Strength | Psi | 16,600 | 15,300 | 13,300 | 14,600 | 12,900 | 12,600 | 14,500 | 14,900 | 13,500 | 12,600 | 13,800 | 12,750 |
| Elongation | % | 2.8 | 2.9 | 1.9 | 2.1 | 1.9 | 1.7 | 2.1 | 2.8 | 2.1 | 2.0 | 2.2 | 1.9 |

What is claimed is:

1. A flame retardant polyamide composition comprising
    (a) about 35 to about 76 percent polyamide;
    (b) about 6 to about 10 percent zinc borate;
    (c) about 10 to about 15 percent melamine cyanurate,
    (d) about 0 to about 35 percent fiberglass;
    (e) about 0 to about 3 percent of antimony trioxide,
    (f) about 8 to about 15 percent of bis(hexachlorocyclopentadieno)cyclooctane,
wherein the percentages are based on the total weight of components (a) through (f).

2. A polyamide composition according to claim 1 comprising 35 to 55 percent polyamide and 15 to 35 percent glass fibers.

3. A polyamide composition according to claim 2 comprising 20 to 30 percent glass fibers.

4. A polyamide composition according to claim 2 wherein the polyamide is nylon 66.

5. A polyamide composition according to claim 2 wherein the polyamide is nylon 6.

6. A polyamide composition according to claim 1 comprising
    (a) about 35 to about 55 percent nylon 6 polyamide;
    (b) about 6 to about 10 percent zinc borate,
    (c) about 10 to about 15 percent melamine cyanurate;
    (d) about 15 to about 30 percent glass fibers;
    (e) about 1 to about 3 percent antimony trioxide;
    (f) about 8 to about 15 percent bis(hexachlorocyclopentadieno)cyclooctane.

7. A polyamide composition according to claim 1 comprising
    (a) about 35 to about 55 percent nylon 66 polyamide;
    (b) about 6 to about 10 percent zinc borate;
    (c) about 10 to about 15 percent melamine cyanurate;
    (d) about 15 to about 30 percent glass fibers;
    (e) about 0 to about 1 percent antimony trioxide,
    (f) about 8 to about 15 percent bis(hexachlorocyclopentadieno)cyclooctane.

* * * * *